United States Patent [19]
Miyamoto et al.

[11] Patent Number: 5,182,888
[45] Date of Patent: Feb. 2, 1993

[54] EARTHQUAKE-PROOFING DEVICE OF PERIPHERALLY RESTRAINED TYPE

[75] Inventors: Yoshiaki Miyamoto, Takarazuka, Japan; Teruo Sasaki; Kazuhiro Fujisawa, both of Kobe; Seinosuke Kato, Nishinomiya, all of Japan

[73] Assignee: Sumitomo Gomu Kogyo Kabushiki Kaisha, Kobe, Japan

[21] Appl. No.: 560,629

[22] Filed: Jul. 31, 1990

[30] Foreign Application Priority Data

Aug. 1, 1989 [JP] Japan ............................. 1-91283[U]
Jul. 13, 1990 [JP] Japan ............................. 2-185581[U]

[51] Int. Cl.$^5$ ............................................. E04B 1/98
[52] U.S. Cl. ................................. 52/167 DF; 52/573
[58] Field of Search ............... 52/167 R, 167 DF, 573; 248/349, 615, 624, 565

[56] References Cited

U.S. PATENT DOCUMENTS

| | | | |
|---|---|---|---|
| 4,499,694 | 2/1985 | Buckle et al. | 52/167 R |
| 4,593,502 | 6/1986 | Buckle | 52/167 R |
| 4,633,628 | 1/1987 | Mostaghel | 52/167 R |
| 4,713,917 | 12/1987 | Buckle et al. | 52/167 R |
| 4,899,323 | 6/1990 | Fukahori et al. | 52/167 R X |

FOREIGN PATENT DOCUMENTS

0287683 5/1988 European Pat. Off. .
2114662 10/1972 Fed. Rep. of Germany .

Primary Examiner—Richard E. Chilcot, Jr.
Attorney, Agent, or Firm—Nikaido, Marmelstein, Murray & Oram

[57] ABSTRACT

An earthquake-proofing device of peripherally restrained type including a laminate constructed by alternately laminating rigid plates and rubber-like elastic plates, the laminate being formed with a cylindrical hollow portion which opens at its opposite ends as viewed in the direction of lamination, and a visco-elastic body to be inserted into the cylindrical hollow portion to fill the latter. The earthquake-proofing device is characterized in that the volume of the visco-elastic body is greater than that of the cylindrical hollow portion by an amount corresponding to the product of the portion of the inner surface area of the cylindrical hollow portion opposed to the rubber-like elastic plates and 5-60% of the thickness of a single rubber-like elastic plate. The visco-elastic body having such excessive volume is pressed into the cylindrical hollow portion.

13 Claims, 6 Drawing Sheets

EARTHQUAKE-PROOFING DEVICE OF PERIPHERALLY RESTRAINED TYPE

TECHNICAL FIELD

The present invention relates to an earthquake-proofing device of peripherally restrained type, and more particularly relates to an earthquake-proofing device of peripherally restrained type having a high damping factor, comprising a laminate formed by alternately laminating a plurality of rigid plates and soft rubber-like elastic plates, said laminate being formed with a cylindrical hollow portion which opens at its opposite ends as viewed in the vertical direction of lamination, and a cylindrical visco-elastic body fitted in said hollow portion to fill the latter.

Figure 15:
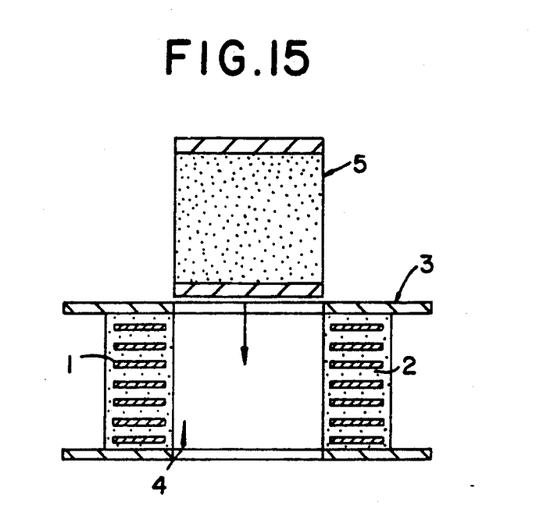
FIG. 15 is a sectional view showing the state established before a visco-elastic body is inserted into the cylindrical hollow portion of a laminate.
Figure 16:
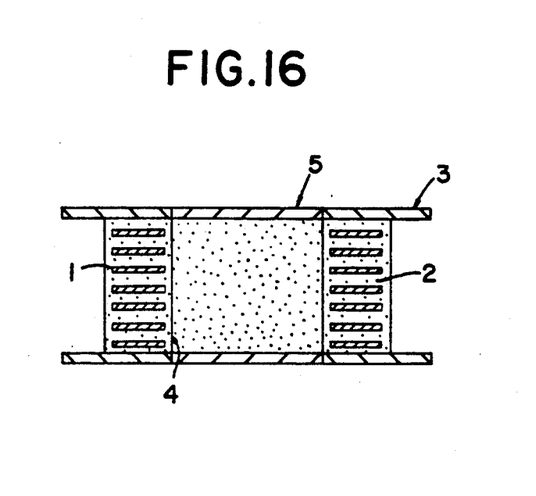
FIG. 16 is a sectional view showing the state established immediately after the visco-elastic body is inserted into the cylindrical hollow portion.

Generally, an earthquake-proofing device is in the form of a laminate formed by alternately laminating rigid plates, such as steel plates, and soft rubber-like elastic plates, and is used to horizontally swingably support an upper structure, such as a building, on a lower structure, such as a foundation, so as to reduce the input acceleration of earthquakes to protect the upper structure from the destructive force of the earthquake. However, this basic construction has almost no ability to absorb the vibration energy during earthquake-proofing operation, taking a long time before the transverse vibrations of the earthquake-proofing operation subside; thus, it is lacking in utility. Accordingly, to increase the ability to damp vibrations, there have been developed devices using an outer damper besides the laminate or replacing the rubber-like elastic plates by highly damping rubber. As other improving means, there has been developed an earthquake-proofing device of peripherally restrained type wherein, as shown in FIGS. 15 and 16, a laminate comprising rigid plates 1 and rubber-like elastic plates 2 is centrally formed with a cylindrical hollow portion 4 vertically extending therethrough, and a cylindrical, highly damping visco-elastic body 5 having the same volume as that of the cylindrical hollow portion fitted in said hollow portion to fill the latter. With the free surface of the visco-elastic body 5 restrained by the surrounding laminate 3, the visco-elastic body 5 absorbs the energy when transversely deformed during earthquake-proofing operation to thereby damp vibrations.

In the earthquake-proofing device described above replacing the rubber-like elastic plates of the laminate by highly damping rubber, the higher the damping property the material has, the greater the creep of the earthquake-proofing device. In contrast thereto, in an earthquake-proofing device of peripherally restrained type having the highly damping visco-elastic body 5 fitted in the cylindrical hollow portion 4 of the laminate 3 to fill the same, a compressive permanent strain in the earthquake-proofing device can be reduced by using a rubber material which will produce a reduced permanent strain for the rubber-like elastic plates 2 of the laminate 3 while the higher damping property is retained by the visco-elastic body 5. At this time, the damping property of the earthquake-proofing device is further enhanced by using a material which will produce a reduced compressive permanent strain and which has a high damping property for the rubber-like elastic plates of the laminate 3.

In the earthquake-proofing device shown in FIGS. 15 and 16, if it is subjected to a vertical load with the visco-elastic body 5 snugly fitted in the cylindrical hollow portion 4 of the laminate 3 to fill said hollow portion, the free surface of the visco-elastic body 5 is restrained by the inner peripheral surface of the cylindrical hollow portion 4 of the laminate 3, so that a high vertical spring constant is obtained.

However, in the above earthquake-proofing device, since the visco-elastic body 5 and the cylindrical hollow portion 4 of the laminate 3 are of the same size, the mechanical fit of the visco-elastic body 5 in the cylindrical hollow portion 4 of the laminate 3 is insufficient, resulting in a great decrease in the vertical spring constant when it is subjected to horizontal shearing deformation due to transverse sway, tending to buckle easily.

Further, this earthquake-proofing device is manufactured by separately vulcanizing or molding the laminate 3 of rigid plates 1 and rubber-like elastic plates 2, and the visco-elastic body 5 and inserting the visco-elastic body 5 into the laminate 3. However, this fitting operation has been very difficult since the outer diameter of the visco-elastic body 5 is the same as the inner diameter of the cylindrical hollow portion 4 and since the frictional resistance between the rubber-like elastic plates 2 and the visco-elastic body 5 is high. To facilitate this operation, it could be contemplated to increase the inner diameter of the cylindrical hollow portion 4 and decrease the outer diameter of the visco-elastic body 5. In this case, however, a clearance is formed between the visco-elastic body 5 and the inner peripheral surface of the cylindrical hollow portion 4, making it impossible to achieve a satisfactory mechanical fit between the visco-elastic body 5 and the inner surface of the cylindrical hollow portion 4; the visco-elastic body is incapable of supporting vertical loads, failing to exert the initial earthquake-proofing performance. Thus, it would be desirable to make the outer diameter of the visco-elastic body slightly greater than the inner diameter of the cylindrical hollow portion 4 to ensure intimate contact therebetween. In this case, the visco-elastic body 5 cannot be fitted in the cylindrical hollow portion 4 by simply pushing the former aiming at the latter. Thus, it becomes necessary to take special measures, such as vertically pulling the visco-elastic body 5 to decrease its outer diameter when it is inserted, but this leads to an increase in the manufacturing cost.

SUMMARY OF THE INVENTION

The present invention has been accomplished with the above problems in mind, and an object thereof is to provide an earthquake-proofing device having a high vertical spring constant provided by simple means and a highly damping performance without any possibility of the vertical spring constant being decreased, while facilitating the operation for inserting the visco-elastic body into the cylindrical hollow portion to fill the latter to improve the manufacturing operation.

The technical means for achieving the above object of the invention lie in that in a device comprising a laminate formed by alternately laminating rigid plates and soft rubber-like elastic plates, said laminate being formed with a cylindrical hollow portion which opens at its opposite ends as viewed in the vertical direction of lamination, and a cylindrical visco-elastic body fitted in said hollow portion to fill the latter, first, a visco-elastic body having a volume greater than that of said cylindrical hollow portion by an amount corresponding to the portion of the inner surface area of said cylindrical hollow portion which is opposed to the rubber-like elastic plates, multiplied by 5-60% of the thickness of a single rubber-like elastic plate, is pushed into the cylindrical hollow portion and, secondly, the contact surfaces of said cylindrical hollow portion and said visco-elastic body are tapered to converge in the direction of insertion of the visco-elastic body. In combination with said two technical means, it is desirable to taper the contact surfaces of the cylindrical hollow portion and the visco-elastic body having a greater volume than that of the cylindrical hollow portion.

In an earthquake-proofing device of peripherally restrained type according to the present invention, since a visco-elastic body having a volume greater than that of said cylindrical hollow portion by an amount corresponding to the portion of the inner surface area of said cylindrical hollow portion which is opposed to the rubber-like elastic plates, multiplied by 5-60% of the thickness of a single rubber-like elastic plate, is pushed into the cylindrical hollow portion, the visco-elastic body fitted in the cylindrical hollow portion of the laminate to fill said hollow portion and thereby having its free surface restrained by the inner surface of the cylindrical hollow portion bulges out into the rubber-like elastic plates by an amount corresponding to the excess volume. This bulging of the visco-elastic body taking place between adjacent rigid plates results in an improved mechanical fit between the visco-elastic body and the laminate; thus it is possible to improve the vertical spring constant with the high damping performance retained and to prevent a decrease in the vertical spring constant in the horizontal shearing deformation state. Further, since the contact surfaces of said cylindrical hollow portion and said visco-elastic body are tapered to converge in the direction of insertion of the visco-elastic body, it becomes very easy to insert the visco-elastic body into the cylindrical hollow portion of the laminate to fill the same, improving the manufacturing operation.

Further, by tapering the contact surfaces of the cylindrical hollow portion and the visco-elastic body having a greater volume than that of the cylindrical hollow portion, there is provided an earthquake-proofing device which makes it possible to ensure intimate contact between the visco-elastic body and the inner peripheral surface of the cylindrical hollow portion without any clearance therebetween, to attain the satisfactory mechanical fit between the visco-elastic body and the laminate, to improve the vertical spring constant, to prevent a decrease in the vertical spring constant in the horizontal shearing deformation state, and to facilitate the insertion of the visco-elastic body into the hollow portion of the cylindrical laminate.

BRIEF DESCRIPTION OF THE DRAWINGS

FIGS. 1 through 14 are for the purpose of explaining earthquake-proofing devices according to embodiments of the present invention;

FIGS. 15 and 16 are for the purpose of explaining a conventional example of an earthquake-proofing device;

DESCRIPTION OF THE PREFERRED EMBODIMENTS

An embodiment of an earthquake-proofing device of peripherally restrained type according to the present invention will now be described with reference to FIGS. 1 through 4.

Figure 1:
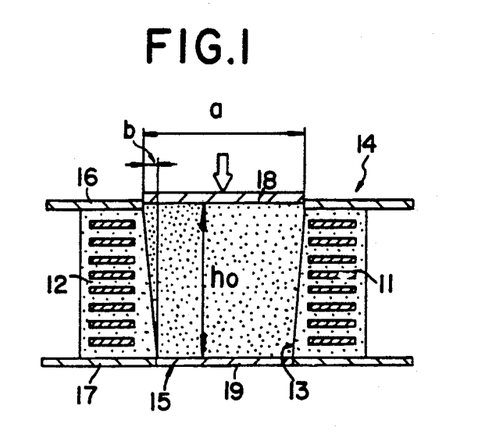
FIG. 1 is a sectional view showing a visco-elastic body immediately after it is inserted into the cylindrical hollow portion of a laminate.

The earthquake-proofing device of peripherally restrained type of the present invention, as shown in FIG. 1, comprises a laminate 14 formed by alternately vertically laminating annular rigid plates 11, such as steel plates, and soft rubber-like elastic plates 12 which will produce a relatively small compressive permanent strain and whose loss factor tan $\delta$ during horizontal shearing is between 0.1 and 0.4 and whose hardness Hs is about 50, the laminate being formed with a cylindrical hollow portion 13 which opens at its vertical opposite ends as viewed in the vertical direction of lamination, and a highly damping visco-elastic body 15 to be inserted in the cylindrical hollow portion 13 to fill the same. The laminate 14 has upper and lower annular flanges 16 and 17 made of rigid material, such as steel plates, attached to the upper and lower surfaces thereof. The rigid plates 11, rubber plates 12 and upper and lower flanges 16 and 17 are united together by applying an adhesive agent to their contact surfaces during vulcanizing or molding operation. On the other hand, the highly damping visco-elastic body 15 has upper and lower rigid, pressure receiving plates 18 and 19 fixed thereto by applying an adhesive agent thereto during vulcanizing or molding operation on the visco-elastic body 15.

Figure 2:
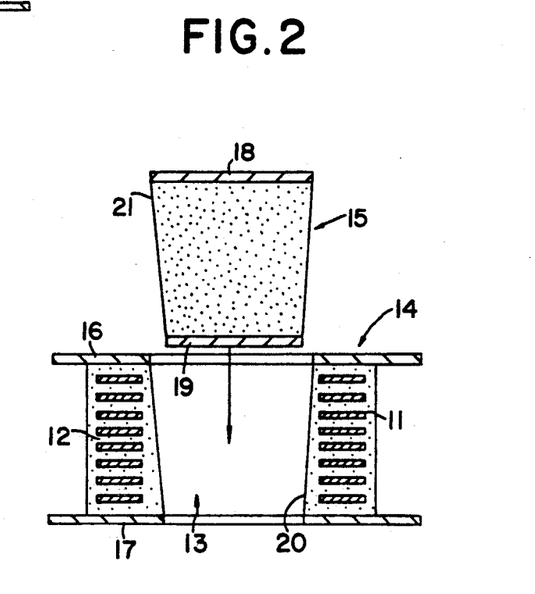
FIG. 2 is a sectional view showing the visco-elastic body before it is inserted into the cylindrical hollow portion.
Figure 3:
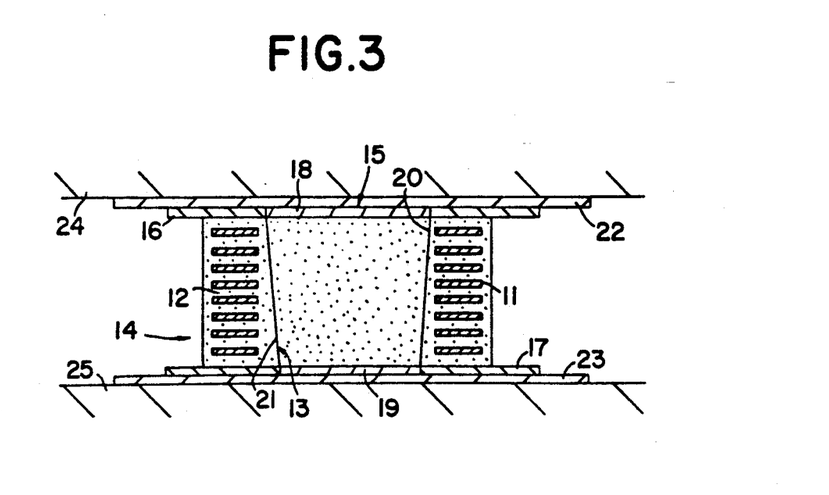
FIG. 3 is a sectional view showing actual use of the earthquake-proofing device.

In the earthquake-proofing device shown in FIG. 1, the volume of the visco-elastic body 15 is greater than that of the cylindrical hollow portion 13 by a predetermined amount (to be later described). Further, as shown in FIG. 2, the contact surfaces of the visco-elastic body 15 and cylindrical hollow portion 13 are tapered surfaces 20 and 21 converging in the direction of insertion of the visco-elastic body 15 (as indicated by an arrow); thus, the outer diameter of the visco-elastic body 15 and the inner diameter of the cylindrical hollow portion 13 are gradually reduced from top to bottom. By making the volume of the visco-elastic body 13 greater than that of the cylindrical hollow portion 13, the mechanical fit of the visco-elastic body 13 in the cylindrical hollow portion is improved and so is the vertical spring constant. Further, by making the contact surface of the visco-elastic body 15 and cylindrical hollow portion 13 in the form of tapered surfaces 20 and 21 converging in the direction of insertion of the visco-elastic body 15, the insertion of the visco-elastic body 15 into the cylindrical hollow portion 13 to fill the latter can be very easily effected; thus, the manufacturing operation is improved. This earthquake-proofing device is used by inserting the visco-elastic body 15 into the cylindrical hollow portion 13 along the tapered surfaces 20 and 21 and then pushing said visco-elastic body 15 into said cylindrical hollow portion 13. In actual use of the earthquake-proofing device, as shown in FIG. 3, the upper and lower flanges 16 and 17 are bolted to upper and lower attaching plates 22 and 23 to maintain the visco-elastic body 15 in the state of being pressed into the cylindrical hollow portion 13. The earthquake-proofing device so prepared is interposed between upper and lower structures 24 and 25 and the upper and lower plates 22 and 23 are bolted to the upper and lower structures 24 and 25.

Figure 4:
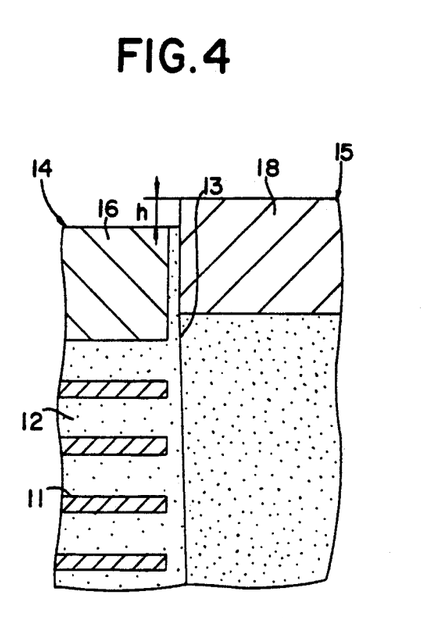
FIG. 4 is an enlarged sectional view of the principal portion of FIG. 1.
Figure 5:
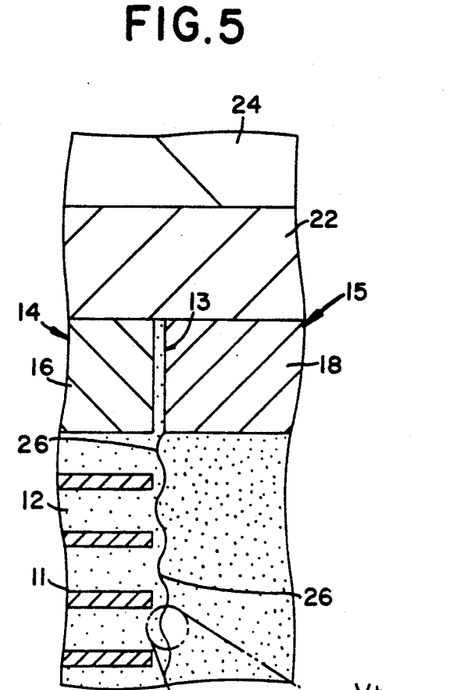
FIG. 5 is an enlarged sectional view of the principal portion of FIG. 3.

The invention will now be described in more detail. FIG. 4 is a fragmentary enlarged sectional view of FIG. 1, showing the state established immediately after the visco-elastic body 15 is inserted into the cylindrical hollow portion 13 of the laminate 14. The visco-elastic body 15 is then pressed into the cylindrical hollow portion 13, as shown in FIG. 5. FIG. 5 is a fragmentary enlarged sectional view of FIG. 3, showing actual use of the earthquake-proofing device. As shown, in the state of actual use with the visco-elastic body 15 pushed into the cylindrical hollow portion 13, the free surface of the visco-elastic body 15 is restrained by the inner peripheral surface of the cylindrical hollow portion 13, with the visco-elastic body 15 bulging into the rubber-like elastic plates 12. The bulge portions 26 of the visco-elastic body 15 push up the laminate 14 by the corresponding amount until the visco-elastic body 15 and the laminate 14 are flush with each other, when they are balanced. Thereby, a satisfactory mechanical fit of the visco-elastic body 15 in the laminate 14 is obtained, and the vertical spring constant in actual use is improved.

To prove the improved vertical spring constant, a test (I) conducted by the present applicant will be described below.

Figures 5A, 6:
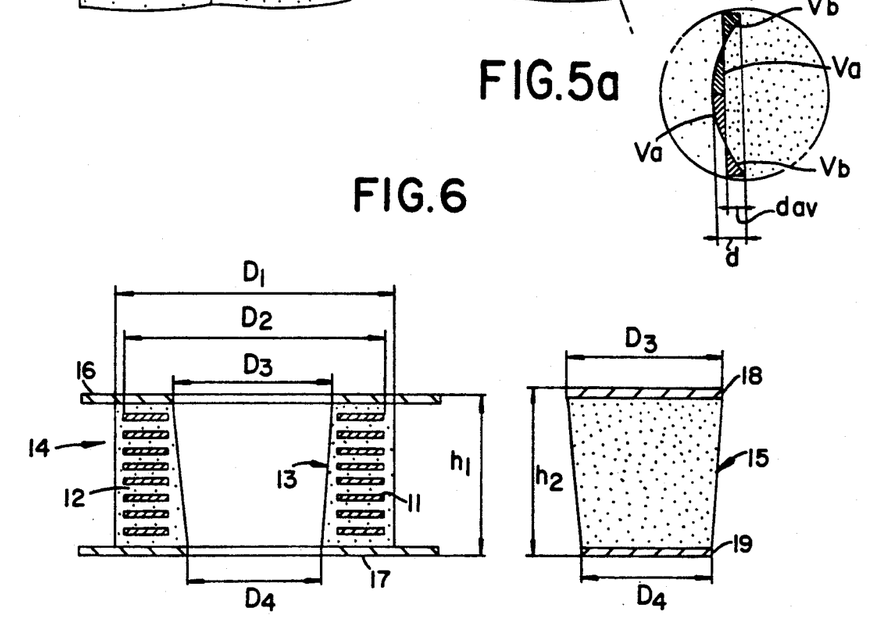
FIG. 6 is a sectional view showing the size and shape of a visco-elastic body and a laminate used in tests conducted by the present applicant.
Figure 7:
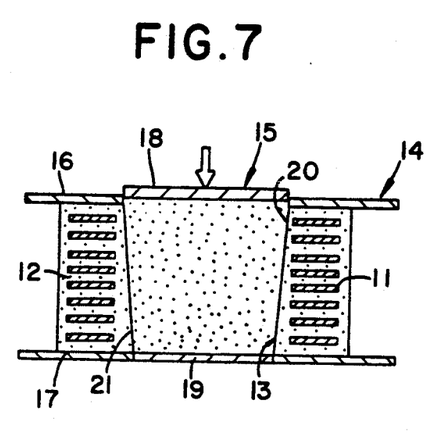
FIG. 7 is a sectional view showing a case where a vertical load is applied to a visco-elastic body alone which is restrained by the laminate, in a test (I)

The size, shape, and material and its physical properties of the earthquake-proofing device used in this test (I) are shown in FIG. 6 and below.

$D_1 = 32$ cm, $D_2 = 30$ cm, $D_3 = 21$ cm, $D_4 = 20.6$ cm, $h_1 = 17.6$ cm, $h_2 = 18.0$ cm.

Rigid plates 11; iron plates, 2 mm × 19 layers

Rubber-like elastic plates 12; rubber plates, 5 mm × 20 layers, hardness $Hs = 45$, $\tan \delta = 0.02$.

COMPOSITION

A composition comprising 100 parts by weight of NR, 15 parts by weight of HAF, 10 parts by weight of plasticizer, 35 parts by weight of filler, and 3 parts by weight of aging-preventive agent and vulcanizer.

Visco-elastic body 15; hardness $Hs = 70$, $\tan \delta = 0.6$.

COMPOSITION

A composition comprising 100 parts by weight of Polynorbornene, 70 parts by weight of FT, 150 parts by weight of plasticizer, 500 parts by weight of filler, and 6 parts by weight of aging-preventive agent and vulcanizer.

In addition, the hardness and $\tan \delta$ included in the physical properties mentioned above will be later described in detail.

In the test (I), the test was made in four ways: (1) a vertical load was imposed on the laminate alone without inserting the visco-elastic body 15, (2) a vertical load was imposed on the visco-elastic body 15 which was not peripherally restrained by the laminate 14, (3) a vertical load was imposed on the visco-elastic body 15 alone which had been inserted into the cylindrical hollow portion 13 of the laminate 14 but had not been pressed in, and (4) a vertical load was imposed after the visco-elastic body 15 was inserted into the cylindrical hollow portion 13 and then pressed thereinto to unite them together (this state is the one in which it is actually used). In addition, the vertical displacement was 3 mm, and the horizontal shearing strain was 0.

The test results are as shown in the following table.

|     |                                              | vertical spring constant $Kv$ (ton/cm) |
| --- | -------------------------------------------- | -------------------------------------- |
| (1) | Laminate alone                               | 24                                     |
| (2) | Visco-elastic body alone                     | 1.2                                    |
| (3) | Visco-elastic body alone restrained by laminate | 64                                  |
| (4) | Composite body                               | 163                                    |

As is clear from the above table, in the cases (1) with the laminate alone and (2) with the visco-elastic body, the vertical spring constant is very low. However, in the case (3) where the visco-elastic body 15 is only restrained by the laminate 14, there is obtained a vertical spring constant which is more than 50 times as high as in (2). Further, in the earthquake-proofing device (4) of the present invention where the visco-elastic body 15 is pressed in under the restraint of the laminate 14, there is obtained a vertical spring constant which is 2.5 times as high as in (3). Thus, with the earthquake-proofing device of the invention, superheavy structures such as buildings can be easily supported.

A description will now be given of the feature that the volume of the visco-elastic body 15 is greater than that of the cylindrical hollow portion 13 by a predetermined amount.

This excess volume is determined in the following manner: In the state of actual use in which the visco-elastic body 15 is inserted and pressed into the cylindrical hollow portion 13 as described above, the visco-elastic body 15, as shown in FIG. 5, bulges into the rubber-like plates 12 of the laminate 14. The total amount of these bulge portions 26 of the visco-elastic body 15 is equal to the excess volume. Let d be the length of the bulge portion 26. The volume of the bulge portions 26 is averaged so that the hatched portions Va and Vb have the same volume so as to set the average length $d_{av}$ of the bulge portion 26. Therefore, the total volume of the bulge portions 26 is equal to the product of the inner surface area opposed to the rubber-like elastic plates 12 and the average length $d_{av}$ of the bulge portions 26. The total volume of said bulge portions is the excess volume, on the basis of which the height h of the visco-elastic body 15 projecting beyond the laminate 14 immediately after the insertion of the visco-elastic body 15 into the cylindrical hollow portion 13 is prescribed.

The applicant has found from a test (II) to be later described that the average length $d_{av}$ of the bulge portions 26 described above is preferably 5–60%, more preferably 10–50%, of the thickness of a single rubber-like elastic plate 12.

By making the volume of the visco-elastic body 15 greater by an amount corresponding to the inner surface area opposed to the rubber-like elastic plates 12 multiplied by 5–60% of the thickness of a single rubber-like elastic plate, the bulging, as at 26, of the visco-elastic body 15 into the rubber like elastic plates 12 makes it possible, even if the earthquake-proofing device is subjected to horizontal shearing displacement, to prevent the vertical spring constant from being decreased in the horizontal shearing deformation state since each bulge portion 26 is positioned between adjacent rigid plates 11 of the laminate 14.

Figure 8:
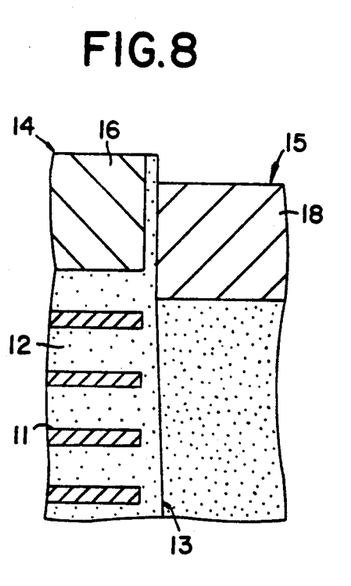
FIG. 8 is an enlarged sectional view of the principal portion, showing the state established immediately after a visco-elastic body having a smaller volume than that of the cylindrical hollow portion is inserted into the latter.
Figure 9:
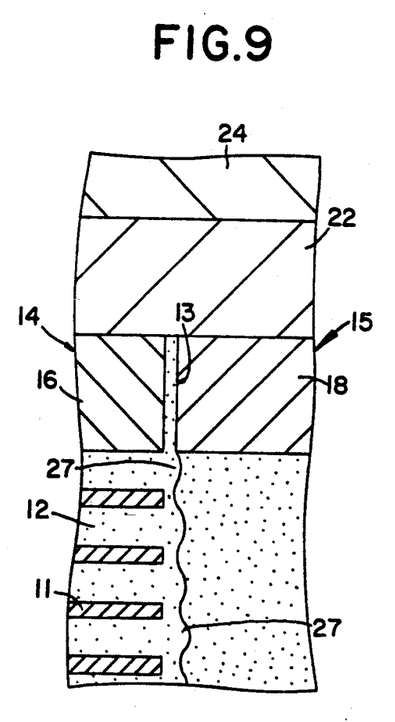
FIG. 9 is an enlarged sectional view of the principal portion, showing actual use of the earthquake-proofing device having the visco-elastic body of FIG. 8.

If the average length $d_{av}$ of said bulge portions 26 is set at a value smaller than 5% of the thickness of a single rubber-like elastic plate, this means to make the height of the visco-elastic body 15 nearly equal to or less than that of the laminate 14, so that the volume of the visco-elastic body 15 is nearly equal to or less than that of the cylindrical hollow portion 13. Then, in actual use of the earthquake-proofing device, the mechanical fit of the visco-elastic body 15 in the laminate 14 would be insufficient, leading to a decrease in the vertical spring constant in the horizontal shearing deformation state, making it impossible to obtain a high damping performance. This will be described in more detail with reference to FIGS. 8 and 9. FIG. 8 shows the state established immediately after a visco-elastic body shorter than the laminate 14 is inserted into the cylindrical hollow portion 13, and FIG. 9 shows the actual use of the earthquake-proofing device. As shown in FIG. 9 and contrary to the case of FIG. 5, the rubber-like elastic plates 12 of the laminate 14 bulge into the visco-elastic body 15, and the bulge portions 27 of the rubber-like elastic plates 12 push up the visco-elastic body 15 by an amount corresponding to the amount of said bulge portions 27, until the height of the visco-elastic body 15 becomes equal to that of the laminate 14, when they balance each other. If horizontal shearing displacement is given in such fit state, the bulging, as at 27, of the rubber-like elastic plates 12 takes places in the visco-elastic body 15 with the absence of the rigid plates 11 as shown in FIG. 5; therefore, slippage tends to take place between the visco-elastic body 15 and the laminate 14 and the vertical spring constant can easily decrease. Therefore, it is necessary to make the volume of the visco-elastic body 15 greater than that of the cylindrical hollow portion 13 by an amount corresponding to the inner surface area of the rubber-like elastic plates 12 multiplied by not less than 5% of the thickness of a single rubber-like plate.

If the average length $d_{av}$ of the bulge portions 26 is set at a value greater than 60% of the thickness of a single rubber-like plate, the rubber-like elastic plates 12 of the laminate 14 will be pushed up too much by the bulging, as at 26, of the visco-elastic body 15 during actual use of the earthquake-proofing device, thus increasing the internal strain in the laminate 14 and decreasing the break strain at the time of horizontal shearing deformation to make it easier for the rubber-like elastic plates 12 of the laminate 14 to break. Particularly, in the case of a small type of laminate 14, the height of the laminate 14 increases and the vertical spring constant further decreases; thus, it tends to buckle. Therefore, it is necessary to make the volume of the visco-elastic body 15 greater than that of the cylindrical hollow portion 13 by an amount corresponding to the inner surface area of the rubber-like elastic plates 12 multiplied by not more than 60% of the thickness of a single rubber-like elastic plate.

Concerning the fact that the volume of the visco-elastic body 15 is made greater than that of the cylindrical hollow portion 13 by an amount corresponding to the inner surface area of the rubber-like elastic plates 12 multiplied by 5–60% of the thickness of a single rubber-like elastic plate, a test (II) conducted by the applicant will now be described to prove the prevention of decrease of the vertical spring constant at the time of shearing deformation.

The size, shape, and material and its physical properties of the earthquake-proofing device used in this test (II) are shown in FIG. 6 and below.

$D_1 = 19$ cm, $D_2 = 18$ cm, $D_3 = 6$ cm, $D_4 = 5.6$ cm, $h_1 = 10.7$ cm, $h_2 = $ various.

Rigid plates 11; iron plates, 1 mm × 13 layers

Rubber-like elastic plates 12; rubber plates, 1 mm × 13 layers, hardness Hs = 53, tan $\delta = 0.03$.

COMPOSITION

A composition comprising 100 parts by weight of NR, 50 parts by weight of HAF, 7.5 parts by weight of plasticizer, 35 parts by weight of filler, and 4 parts by weight of aging-preventive agent and vulcanizer.

Visco-elastic body 15; hardness Hs = 60, tan $\delta = 1.0$.

COMPOSITION

A composition comprising 100 parts by weight of polyisobutylene, 120 parts by weight of HAF, 215 parts by weight of finely divided talc, 3 parts by weight of titanium coupling agent, 60 parts by weight of plasticizer, 5 parts by weight of filler, and 2 parts by weight of aging-preventive agent and vulcanizer.

In addition, the hardness and tan $\delta$ included in the physical properties mentioned above will be later described in detail as in the test (I).

In the test (II), visco-elastic bodies 15 having various heights $h_2$ were prepared. To be concrete, the difference in height, $h_2 - h_1$, that is, the height h (see FIG. 4) by which the visco-elastic body 15 projects beyond the laminate 14, the average length $d_{av}$ (see FIG. 5) of the bulge portions 26 of the visco-elastic body 15 in actual use calculated from the projecting height h of the visco-elastic body, and its ratio to the thickness of a single rubber-like elastic plate were prepared as shown in the following table.

| Kind of visco-elastic body | $A_1$ | $A_2$ | $A_3$ | $A_4$ | $A_5$ | $A_6$ | $A_7$ |
|---|---|---|---|---|---|---|---|
| Projecting height h mm | −2 | 0 | 2 | 4 | 6 | 8 | 10 |
| Length $d_{av}$ of bulge | −0.5 | 0 | 0.5 | 1.1 | 1.6 | 2.1 | 28 |
| Ratio to thickness (4 mm) of single rubber-like elastic plate, % | −12.5 | 0 | 12.5 | 27.5 | 40 | 52.5 | 70.0 |

Figure 10:
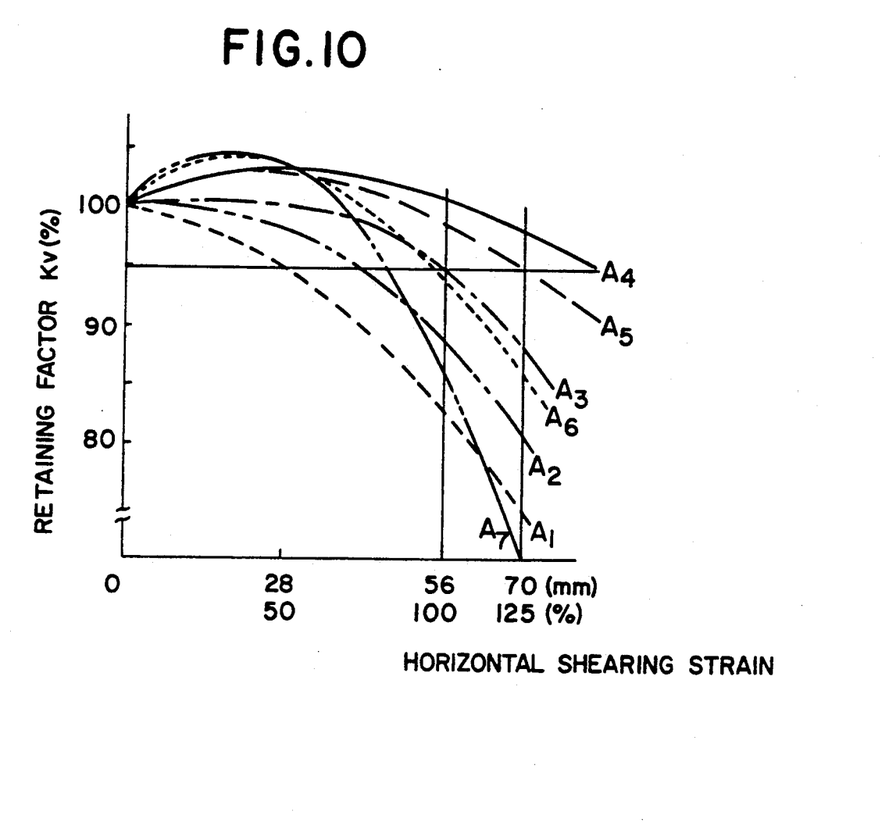
FIG. 10 is a characteristic diagram showing the retaining factor with respect to the horizontal shearing strain obtained in a test (II).

FIG. 10 shows the retaining factor of vertical spring constant (the vertical spring constant in the nondeformation state is rated at 100%) with respect to horizontal shearing strains when a vertical load of 8 t is applied to produce horizontal shearing displacement in the visco-elastic bodies 15 of kinds A1 through A7 shown in the above table.

As is clear from the retaining factor characteristics, in the case of visco-elastic bodies 15 of $A_4$ and $A_5$ where the average length $d_{av}$ of bulge portions 26 is 27.5% (1.1 mm) or 40% (1.6 mm) of the thickness (4 mm) of a single rubber-like elastic plate, a retaining factor of not less than 95% is secured even at a horizontal shearing strain of 125% and the decrease in the vertical spring constant is very low. In the visco-elastic bodies 15 of $A_3$ and $A_6$ where the average length $d_{av}$ of bulge portions 26 is 12.5% (0.5 mm) or 52.5% (2.1 mm) of the thickness of a single rubber-like elastic plate, a retaining factor of not less than 95% is obtained for a horizontal shearing strain of 100%; there is little decrease in the vertical spring constant during horizontal shearing deformation. However, in the visco-elastic bodies 15 of $A_2$ and $A_7$ where the average length $d_{av}$ of bulge portions 26 is 0% (0 mm) or 70% (2.8 mm) of the thickness of a single rubber-like elastic plate, the retaining factor obtained is only 95% or less for a horizontal shearing strain of 100%; the decrease in the vertical spring constant during horizontal shearing deformation is extremely high. Further, in the visco-elastic body 15 of $A_1$ where the average length $d_{av}$ of bulge portions 26 is −12.5% (−0.5 mm), that is, in a visco-elastic body 15 which is shorter than the laminate 14 and whose volume is less than that of the cylindrical hollow portion 13 as shown in FIGS. 8 and 9, the retaining factor obtained is only 85% or less; the decrease in the vertical spring constant is very large. It is seen from the above that with the earthquake-proofing device of the present invention, the decrease in the vertical spring constant during horizontal shearing deformation can be minimized.

Next, a description will now be given of the feature that the contact surfaces of the visco-elastic body 15 and cylindrical hollow portion 13 are in the form of tapered surfaces 20 and 21 converging in the direction of insertion of the visco-elastic body 15.

The tapered surfaces 20 and 21 are such that the outer diameter of the visco-elastic body 15 (the inner diameter of the cylindrical hollow portion 13) gradually decreases from top to bottom. Thereby, in manufacturing the earthquake-proofing device, the operation of inserting the visco-elastic body 15 into the cylindrical hollow portion 13 of the laminate 14 to fill the same is facilitated, making it easier to effect intimate contact between the visco-elastic body 15 and the inner peripheral surface of the cylindrical hollow portion 13 such that no clearance whatsoever is formed therebetween, thus providing a satisfactory mechanical fit of the visco-elastic body 15 in the laminate 14. The tapered surfaces 20 and 21 are determined as shown in FIG. 1 such that $0 < b/ho < a/2$, preferably $1/100 < b/ho < 1/20$.

Figure 11:
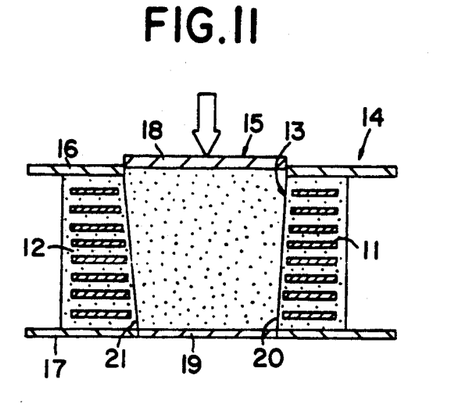
FIG. 11 is a sectional view showing the state established immediately after a visco-elastic body is inserted into the cylindrical hollow portion of a laminate having rigid plates gradually reduced in diameter along a taper surface.

In addition, in the case where the rubber wall thickness measured from the inner end of each rigid plate 11 in the lower region of the laminate 14 to the inner peripheral surface is increased by making the inner peripheral surface of the cylindrical hollow portion 13 in the form of the tapered surface 20, such increase in the rubber wall thickness can be avoided, as shown in FIG. 11, by gradually decreasing the inner diameters of the rigid plates 11 along the tapered surface 20; therefore, when the visco-elastic body 15 is inserted and pressed into the cylindrical hollow portion 13, it is certain that the bulge portions 26 of the visco-elastic body 15 are each interposed between adjacent rigid plates 11; thus, a satisfactory mechanical fit between the visco-elastic body 15 and the laminate 14 is obtained.

Figure 12:
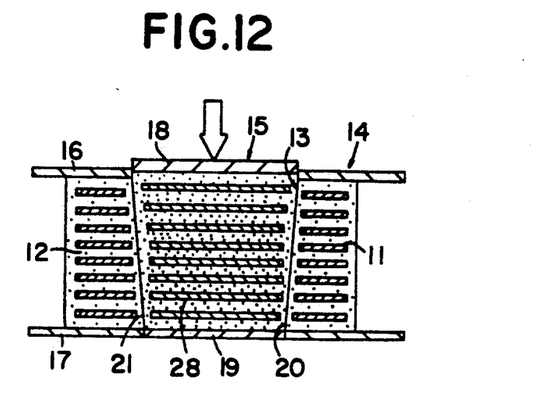
FIG. 12 is a sectional view showing the state established immediately after a laminate type visco-elastic body having a plurality of rigid plates embedded therein is inserted into the cylindrical hollow portion of a laminate.

By making the contact surfaces of the visco-elastic body 15 and cylindrical hollow portion 13 in the form of tapered surfaces 20 and 21, a laminated type highly damping visco-elastic body 15 constructed by alternately laminating the aforesaid visco-elastic body and rigid plates 28 can be inserted in the cylindrical hollow portion 13 to fill the latter. In this case, in the state of actual use in which the laminated type visco-elastic body 15 is inserted into the cylindrical hollow portion 13 to fill the latter, each of the rigid plates 28 of said laminated type visco-elastic body 15 must be flush with the associated rigid plate 11. If not, the bulging, as at 26, of the visco-elastic body 15 into the rubber-like elastic plates 12 of the laminate 14 would be insufficient, making it difficult to obtain a satisfactory mechanical fit. At this time, the rigid plate 28 in the visco-elastic body 15 may be arranged at the same intervals as those for the rigid plates 11 of the laminate 14 or at intervals of one or more layers.

In addition, the visco-elastic body in the present invention can also be formed by injecting a predetermined amount of visco-elastic material into the cylindrical hollow portion 13 of the laminate 14. In this case, the tapered surface 20 is not always necessary.

Finally, physical properties of the material or composition for the visco-elastic body 15 of the earthquake-proofing device of the present invention will now be described in more detail.

In the actual use of the earthquake-proofing device, the visco-elastic body 15 inserted into the cylindrical hollow portion 13 to fill the latter is in mechanically fitted relation to the laminate 14 under high pressure condition; therefore, an earthquake-proofing device having a more highly damping property can be realized by adding a reinforcing filler such as carbon black or silica or a filler which exhibits a reinforcing property when subjected to special surface treatment (such fillers being hereinafter referred to as the fillers with reinforcing property) so as to increase the energy loss due to internal friction during horizontal shearing deformation.

Thus, said visco-elastic body 15 preferably has the following physical properties and components.

(i) Loss factor (tan δ) at 25° C., 0.5 Hz, 50% shearing deformation: $0.2 \leq \tan \delta \leq 1.5$, more preferably, $0.4 \leq \tan \delta \leq 1.5$.

(ii) Hardness (JIS K6301 TYPE A, value taken 3 seconds after pressing): $30 \leqq$ hardness $(Hs) \leqq 80$ (iii) Fillers with reinforcing property:

Materials for the visco-elastic body 15 include such rubber materials as IIR, halogenated IIR, BR, NBR, NR, EPT, EPDM, CR, Polynorbornene, chlorosulfonated polyethylene, silicone rubber, urethane elastomer, fluoroelastomer, chlorinated polyethylene and epichlorohydrin rubber, said rubber materials having mixed therewith said fillers with reinforcing property, non-reinforcing fillers, softeners, surface treating agents, resins, aging-preventive agents, vulcanizers, such mixtures being vulcanized. Besides these, there may be used non-cross-linked materials, such as polyisobutylene, mixed with fillers with reinforcing property, non-reinforcing fillers, surface treating agents, softeners, resins, and aging-preventive agents. Such rubber compositions may be used after vulcanization or without being vulcanized.

The tan $\delta$ shown in (i) above will now be described in detail. The tan $\delta$ is a scale indicating the damping performance and since the characteristics during large deformation are important from the standpoint of design, the tan $\delta$ is set at a value associated with 50% shearing deformation. Generally, the higher the tan $\delta$, the better the energy absorption property, but temperature dependence of the material appears. For earthquake-proofing devices, it is not desirable that the characteristics change with temperature; therefore, a material having no temperature dependence is suitable. Usually, a material having little temperature dependence is used for the laminate 14. Thus, even if the visco-elastic body 15 has more or less temperature dependence, the temperature dependence of the entire earthquake-proofing device can be substantially eliminated. Therefore, the tan $\delta$ is determined by various conditions including the damping capacity required for the earthquake-proofing device, the size and shape of the visco-elastic body 15. If the tan $\delta$ is less than 0.2, a simple laminated type earthquake-proofing device without the creep problem as in the prior art could be manufactured and the significance of adopting the earthquake-proofing construction of the present invention would be lost. If the tan $\delta$ is greater than 1.5, the temperature dependence of the visco-elastic body 15 becomes too large to be decreased by the laminate 14; thus, the temperature dependence of the entire earthquake-proofing device is increased to a large extent.

The hardness in (ii) above will now be described. The difficulty or ease with which the mechanical fit of the visco-elastic body 15 in the laminate 14 is obtained, is determined by the hardness thereof. If the hardness is less than 30, the amount of oil or the like in the compound is large, bleeding to the surface of the visco-elastic body 15 to assist the latter in slipping on the laminate 14, so that the vertical spring constant during horizontal shearing deformation tends to decrease. Further, if the hardness exceeds 80, the visco-elastic body 15 becomes too hard to provide a satisfactory mechanical fit of the visco-elastic body 15 in the laminate 14.

Addition of a filler with reinforcing property mentioned in (iii) above will now be described. Let the amount of a filler with reinforcing property with respect to said raw material rubber be y parts by weight and the amount of other fillers be x parts by weight. Then, the compounding which satisfies the conditions $x \leqq 450$, $y \leqq 150$ and $x + y \geqq 100$, is preferable. If the sum of the amount of a filler with reinforcing property and the amount of other fillers is less than 100 parts by weight, the damping ability decreases. Further, if the amount of said filler with reinforcing property and the amount of other fillers are greater than 150 parts by weight and 450 parts by weight, respectively, then the workability deteriorates.

As for the hardness mentioned in (ii) above, a test (III) conducted by the present applicant to prove the prevention of the vertical spring constant from decreasing during horizontal shearing deformation will be described below.

The size, shape, and material and its physical properties of the earthquake-proofing device used in this test (III) are shown in FIG. 6 and below.

$D_1 = 19$ cm, $D_2 = 18$ cm, $D_3 = 6$ cm, $D_4 = 5.6$ cm, $h_1 = 10.7$ cm, $h_2 = 11.1$ cm.

Rigid plates 11; iron plates, 1 mm × 13 layers

Rubber-like elastic plates 12; rubber plates, 4 mm × 14 layers, hardness $Hs = 53$, tan $\delta = 0.3$.

COMPOSITION

A composition comprising 100 parts by weight of NR, 50 parts by weight of HAF, 7.5 parts by weight of plasticizer, 35 parts by weight of filler, and 4 parts by weight of aging-preventive agent and vulcanizer.

In the test (III) described above, the visco-elastic bodies 15 used had the hardness values shown in the following table.

| Kind of visco-elastic body | $B_1$ | $B_2$ | $B_3$ |
|---|---|---|---|
| Hardness (Hs) | 25 | 60 | 90 |
| Tan $\delta$ | 0.3 | 0.8 | 1.2 |

COMPOSITION OF $B_1$

A composition comprising 100 parts by weight of Polynorbornene, 10 parts by weight of wet silica, 200 parts by weight of plasticizer, 35 parts by weight of filler, and 6 parts by weight of aging-preventive agent and vulcanizer.

COMPOSITION OF $B_2$

A composition comprising 100 parts by weight of polyisobutylene, 70 parts by weight of HAF, 85 parts by weight of finely divided talc, 1.2 parts by weight of titanium coupling agent, 20 parts by weight of plasticizer, 5 parts by weight of filler, and 2 parts by weight of aging-preventive agent and vulcanizer.

COMPOSITION OF $B_3$

A composition comprising 100 parts by weight of NR, 90 parts by weight of HAF, 7.7 parts by weight of plasticizer, 50 parts by weight of filler, and 4 parts by weight of aging-preventive agent and vulcanizer.

Figure 13:
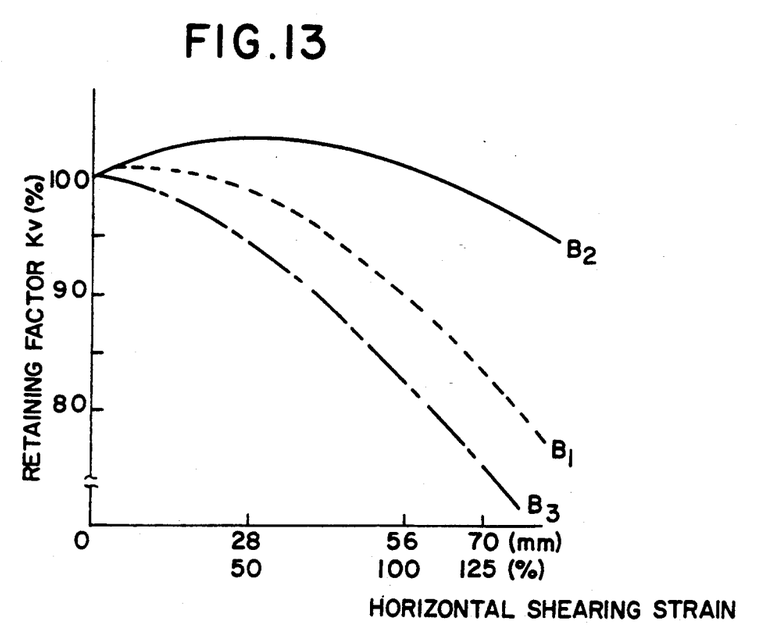
FIG. 13 is a characteristic diagram showing the retaining factor with respect to the horizontal shearing strain obtained in a test (III)

The vertical spring constant retaining factors with respect to horizontal shearing strains (the vertical spring constant in the no deformation state being rated at 100%) obtained when a vertical load of 8 t is applied to the visco-elastic bodies of the kinds $B_1$ through $B_3$ shown in the above table are shown in FIG. 13.

As is clear from the retaining factor characteristics shown in FIG. 13, for the visco-elastic body 15 of $B_2$ having a hardness of 60, a retaining factor of not less than 95% is secured even when the horizontal shearing strain is 125%; thus, the decrease in the vertical spring constant during horizontal shearing deformation is very small. However, in the case of the visco-elastic bodies 15 of $B_1$ and $B_2$ having hardnesses of 25 and 90 respectively, even when the horizontal shearing strain is 100%, the retaining factor obtained is only 90% or less; thus, the vertical spring constant during horizontal shearing deformation decreases to a great extent. It is seen from the above that with the earthquake-proofing device of the present invention, the decrease of the vertical spring constant during horizontal shearing deformation can be minimized.

A test (IV) conducted by the present applicant to prove improved damping performance provided by a filler with reinforcing property mentioned in (iii) above will be described below.

The size, shape, and material and its physical properties of the earthquake-proofing device used in this test (IV) are shown in FIG. 6 and below.

Test Nos. 1, 3, 4

$D_1 = 19$ cm, $D_2 = 18$ cm, $D_3 = 6$ cm, $D_4 = 5.6$ cm, $h_1 = 10.7$ cm, $h_2 = 11.1$ cm.

Rigid plates 11; iron plates, 1 mm × 13 layers

Rubber-like elastic plates 12; rubber plates, 4 mm × 14 layers, hardness $H_s = 53$, tan $\delta = 0.3$.

Test No. 2

$D_1 = 32$ cm, $D_2 = 30$ cm, $D_3 = 21$ cm, $D_4 = 20.6$ cm, $h_1 = 17.6$ cm, $h_2 = 18.0$ cm.

Rigid plates 11; iron plates, 2 mm × 19 layers

Rubber-like elastic plates 12; rubber plates, 5 mm × 20 layers, hardness $H_s = 45$, tan $\delta = 0.6$.

COMPOSITION

A composition comprising 100 parts by weight of NR, 15 parts by weight of HAF, 10 parts by weight of plasticizer, 35 parts by weight of filler, and 4 parts by weight of aging-preventive agent and vulcanizer.

In the above test (IV), the amounts of reinforcing carbon and other fillers for the visco-elastic body 15 are shown in the following table.

| Test No. | 1, 3, 4 | 2 |
|---|---|---|
| Kind of visco-elastic body | C1 | C2 |
| Reinforcing carbon | 120 | 0 |
| Harndess Hs | 60 | 70 |
| Tan $\delta$ | 1.0 | 0.9 |
| Other fillers | 220 | 400 |

COMPOSITION OF $C_1$

A composition comprising 100 parts by weight of polyisobutylene, 120 parts by weight of HAF, 215 parts by weight of finely divided talc, 3 parts by weight of titanium coupling agent, 60 parts by weight of plasticizer, 5 parts by weight of filler, and 2 parts by weight of aging-preventive agent and vulcanizer.

COMPOSITION OF $C_2$

A composition comprising 100 parts by weight of Polynorbornene, 70 parts by weight of FT, 150 parts by weight of plasticizer, 500 parts by weight of filler, and 6 parts by weight of aging-preventive agent and vulcanizer.

In addition, in this test (IV), the damping performance was measured for $E_1$ (Test No. 3): $h_2 = 10.5$ cm (h = −2 mm) in which the volume of the visco-elastic body 15 was less than that of the cylindrical hollow portion 13, $E_2$ (Test No. 4): $h_2 = 10.7$ cm (h = 0 mm) in which it is the same, and $E_3$ (Test No. 1): $h_2 = 11.1$ cm (h = 4 mm) in which it is greater. The visco-elastic bodies 15 used had a hardness of 60, tan $\delta = 1.0$ and contained 120 parts by weight of reinforcing carbon.

Figure 14:
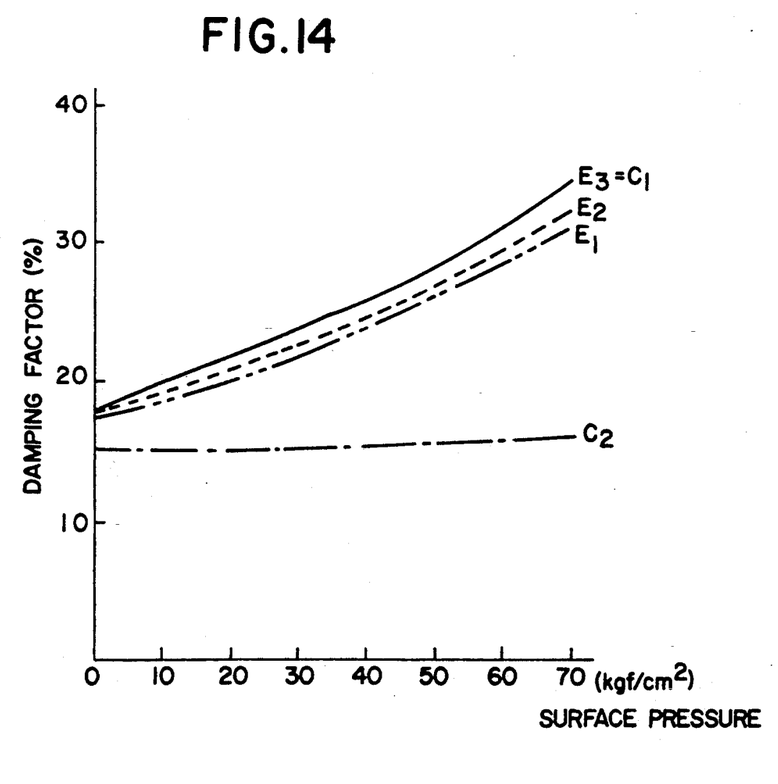
FIG. 14 is a characteristic diagram showing the damping factor in function of the surface pressure obtained in a test (IV)

Damping ratios for surface pressures due to vertical loads when horizontal displacement is produced under high pressure conditions established by vertical loads are shown in FIG. 14 for various visco-elastic bodies 15 of $E_1$, $E_2$, $E_3 = C_1$, $C_2$.

As is clear from the damping ratio characteristics in FIG. 14, concerning the visco-elastic bodies 15 of $E_1$ through $E_3$, the visco-elastic body 15 of $E_2$ in the earthquake-proofing device of the present invention has a damping ratio which is higher than the others, and a large internal energy loss, indicating a high damping performance.

Of the visco-elastic bodies 15 having excessive volumes, the visco-elastic body 15 of $E_3 = C_1$ contains 120 parts by weight of reinforcing carbon, while the visco-elastic body 15 of $C_2$ does not contain reinforcing carbon. As a result, the visco-elastic body 15 of $C_1$ containing reinforcing carbon shows a damping ratio which increases with increasing surface pressure, while the visco-elastic body 15 of $C_2$ shows a damping ration which does not increase. Therefore, with the earthquake-proofing device of the present invention, when the visco-elastic body 15 containing a filler with reinforcing property is subjected to a high pressure, the energy loss in the visco-elastic body increases; thus, an earthquake-proofing device having a higher damping performance can be realized.

In addition, in the earthquake-proofing device of the present invention, additional visco-elastic body (not shown) may also be disposed around the outer periphery of the laminate 14 so as to provide a further improved damping performance and a fire resistance. In the earthquake-proofing device of the present invention, the volume of the visco-elastic body is made greater than that of the cylindrical hollow portion and pressed into the latter, thereby providing a satisfactory mechanical fit of the visco-elastic body in the cylindrical hollow portion; thus, it is possible to provide an earthquake-proofing device of high damping ability, capable of greatly improving the vertical spring constant and minimizing the decrease in the vertical spring constant during horizontal shearing deformation.

Further, by making the contact surfaces of the visco-elastic body and cylindrical hollow portion in the form of tapered surfaces, it becomes very easy to insert the visco-elastic body into the cylindrical hollow portion to fill the latter in manufacturing the earthquake-proofing device; the assembly of the earthquake-proofing device is also facilitated. Thus, the earthquake-proofing device of the invention is of high practical value.

What is claimed is:

1. An earthquake-proofing device of peripherally restrained type comprising:
   a laminate constructed by alternately laminating rigid plates and rubber-like elastic plates, said laminate being formed with a cylindrical hollow portion open at opposite vertical ends;
   flanges formed on opposite ends of said laminate;
   a visco-elastic body inserted into said cylindrical hollow portion and filling said hollow portion, wherein a volume of said visco-elastic body is greater than a volume of said cylindrical hollow portion by an amount equal to a product of that portion of an inner surface area of said cylindrical hollow portion opposed to said rubber-like elastic plates and 5–60% of a thickness of a single rubber-like elastic plate of said rubber-like plates; and pressure receiving plates located on opposite ends of said visco-elastic body wherein when assembled for use, said pressure receiving plates being adjacent to said flanges when said visco-elastic body, having said greater volume, is compressed into said cylindrical hollow portion.

2. An earthquake-proofing device of peripherally restrained type including a laminate constructed by alternately laminating rigid plates and rubber-like elastic plates, said laminate being formed with a cylindrical hollow portion open at its opposite vertical ends, and a visco-elastic body inserted into said cylindrical hollow portion and filling said hollow portion, said earthquake-proofing device being characterized in that:

contact surfaces between said visco-elastic body and said cylindrical hollow portion are tapered and converge in the direction of insertion of said visco-elastic body into said cylindrical hollow portion.

3. An earthquake-proofing device of peripherally restrained type as recited in claim 1 wherein said contact surfaces of said visco-elastic body and said cylindrical hollow portion are tapered surfaces converging in the direction of insertion of said visco-elastic body into said tapered cylindrical hollow portion.

4. An earthquake-proofing device of peripherally restrained type as recited in claim 1 or claim 2 wherein said visco-elastic body contains a filler with reinforcing property.

5. An earthquake-proofing device of peripherally restrained type as recited in claim 4 wherein the amount of said filler with reinforcing property is not more than 150 parts by weight, the amount of other fillers is not more than 450 parts by weight, and the sum of the amount of said filler with reinforcing property and the amount of other fillers is not less than 100 parts by weight.

6. An earthquake-proofing device of peripherally restrained type as recited in claim 1 or claim 2, wherein the loss factor at horizontal shearing of said visco-elastic body is between 0.2 and 1.5.

7. An earthquake-proofing device of peripherally restrained type as recited in claim 1 or claim 2, wherein the hardness of said visco-elastic body is between 30 and 80.

8. An earthquake-proofing device of peripherally restrained type as recited in claim 1 or claim 2, wherein said visco-elastic body contains not more than 150 parts by weight of a filler with reinforcing property, not more than 450 parts by weight of other fillers, the sum of the amount of the filler with reinforcing property and the amount of other fillers being not less than 100 parts, the loss factor at horizontal shearing at 25° C., 0.5 Hz, 50% shearing deformation between 0.2 and 1.5, and hardness taken 3 seconds after pressing between 30 and 80.

9. An earthquake-proofing device of peripherally restrained type as recited in claim 2, wherein said rigid plates in said laminate are gradually decreased in diameter along the tapered surfaces converging in the direction of insertion of said visco-elastic body into said cylindrical hollow portion.

10. An earthquake-proofing device of peripherally restrained type as recited in claim 2, wherein said visco-elastic body has embedded therein a plurality of rigid plates spaced from each other in the direction of insertion into the laminate.

11. An earthquake-proofing device of peripherally restrained type as recited in claim 10 wherein said rigid plates in said visco-elastic body are arranged at the same intervals as said rigid plates in said laminate and at the same levels as said rigid plates of said laminate.

12. An earthquake-proofing device of peripherally restrained type as recited in claim 1 or claim 2, wherein said rubber-like elastic plates of said laminate produce decreased compressive permanent strains and have a loss factor at horizontal shearing between 0.1 and 0.4.

13. An earthquake-proofing device of peripherally restrained type as recited in claim 10 wherein said rigid plates in said visco-elastic body are arranged at intervals of one or more layers and at the same levels as said rigid plates of said laminate.

* * * * *